(12) United States Patent
Aesch, Jr.

(10) Patent No.: US 7,314,186 B1
(45) Date of Patent: Jan. 1, 2008

(54) WHEEL MOUNTED SPRAYING ASSEMBLY AND METHOD

(76) Inventor: Harold W. Aesch, Jr., 7225 W. Galveston St., Suite #1, Chandler, AZ (US) 85226

( * ) Notice: Subject to any disclaimer, the term of this patent is extended or adjusted under 35 U.S.C. 154(b) by 280 days.

(21) Appl. No.: 11/046,998

(22) Filed: Jan. 31, 2005

(51) Int. Cl.
*A01G 25/09* (2006.01)
*B05B 9/00* (2006.01)
*B05B 3/00* (2006.01)

(52) U.S. Cl. ............. 239/146; 239/147; 239/156; 239/157; 239/162; 239/722; 239/741

(58) Field of Classification Search ........... 239/146, 239/147, 156, 157, 162, 722, 754, 741, 726
See application file for complete search history.

(56) References Cited

U.S. PATENT DOCUMENTS

| | | | | |
|---|---|---|---|---|
| 2,889,994 A | * | 6/1959 | French ............... | 239/159 |
| 3,508,709 A | * | 4/1970 | Serbousek et al. ... | 239/754 |
| 4,022,382 A | * | 5/1977 | Engdahl, Jr. ........ | 239/754 |
| 4,095,746 A | * | 6/1978 | Anderberg et al. ... | 239/754 |
| 4,109,865 A | * | 8/1978 | Hurtado T. et al. .. | 239/147 |
| 6,247,658 B1 | * | 6/2001 | Bakas ............... | 239/722 |
| 6,805,304 B1 | * | 10/2004 | Nokes et al. ........ | 239/146 |

* cited by examiner

*Primary Examiner*—Davis Hwu
(74) *Attorney, Agent, or Firm*—John D. Lister

(57) ABSTRACT

A method of applying a chemical material, such as a pesticide, to a surface utilizes a wheel mounted spraying assembly. The wheel mounted spraying assembly includes: a rod having a wheel rotatably mounted on its lower end portion for supporting the spraying assembly on a generally horizontal surface and enabling the spraying assembly to be moved over the surface; a spray nozzle mounted on the spraying assembly adjacent the wheel; a supply line for supplying a chemical material under pressure to the spray nozzle; and a control for controlling the flow of the chemical material to and through the spray nozzle. The spray nozzle is oriented to spray the chemical material in an expanding pattern in an outward direction to one side of the lower portion of the spraying assembly to apply the chemical material to a generally vertical and/or generally horizontal surface.

15 Claims, 3 Drawing Sheets

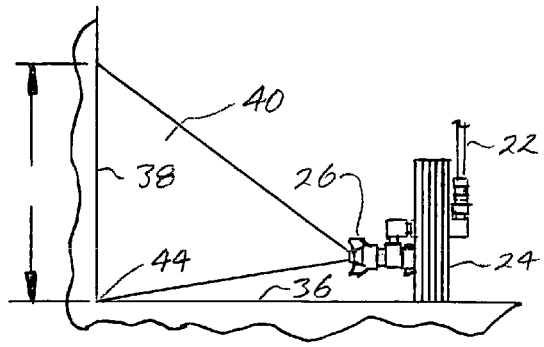
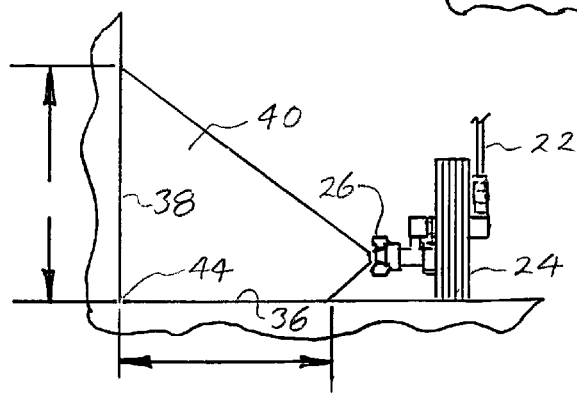
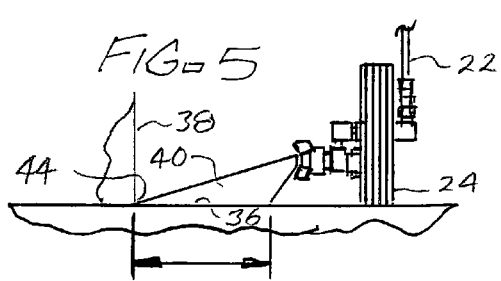
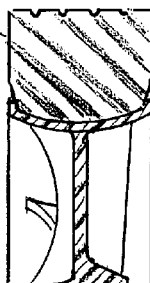
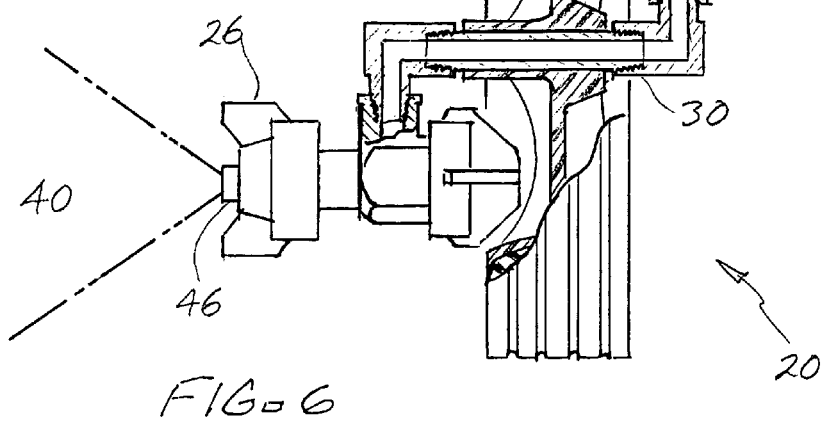

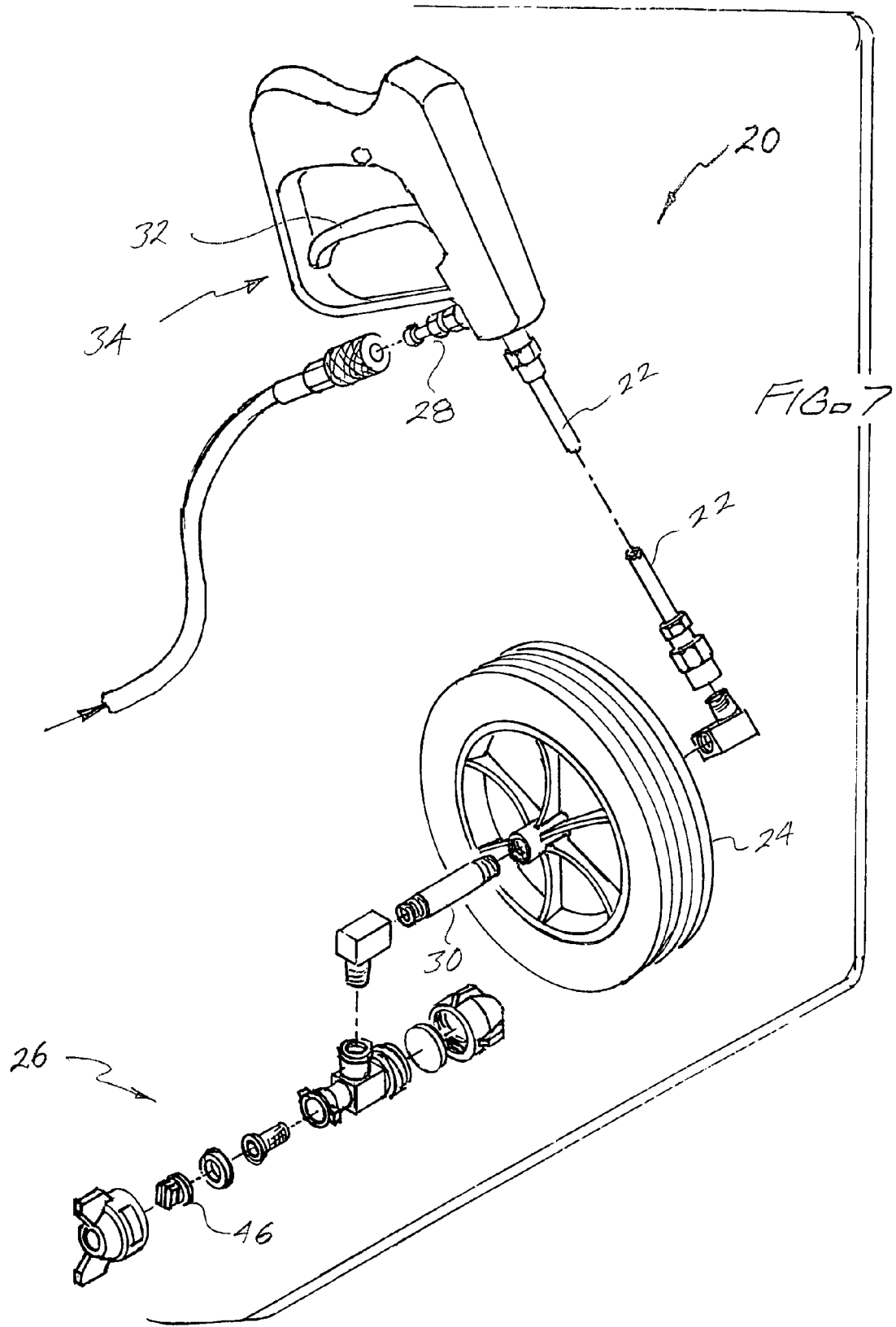

WHEEL MOUNTED SPRAYING ASSEMBLY AND METHOD

BACKGROUND OF THE INVENTION

The subject invention relates to a method of applying a chemical material, such as a pesticide, to a surface that utilizes a wheel mounted spraying assembly and to the wheel mounted spraying assembly. The method and wheel mounted spraying assembly of the subject invention spray the chemical material in an expanding pattern in an outward direction from one side of the lower portion of the spraying assembly to apply the chemical material to generally vertical and/or generally horizontal surfaces.

The lower portions of the exterior and interior surfaces of exterior building walls, the lower portions of the surfaces of interior building walls, baseboards, the ground or floors immediately adjacent building walls, the lower portions of building walls and the ground or floors immediately adjacent these building walls, etc. frequently require a treatment with a chemical material. By way of example, these and other vertical and horizontal surfaces of building structures and the ground immediately adjacent such building structures are frequently treated with termiticides and various other pesticides with the pesticides typically being applied in a band between twelve and twenty four inches wide along the base portion of a wall and/or the ground immediately adjacent the wall.

In the past, these chemical materials typically have been applied to these vertical and horizontal surfaces by technicians using handheld spraying wands connected to a pressurized source of the chemical material being applied. When applying these chemical materials to vertical and/or horizontal surfaces with spraying wands, the spraying strokes utilized by the technicians to apply these chemical materials with the spraying wands easily results in uneven applications of the chemical materials to the surfaces being treated and in applications wherein the band widths of the chemical materials applied to the surfaces are greater than, less than, or vary between greater and less than the chemical material band width desired or required for the applications. Thus, such application procedures can often result in: a costly misapplication and over usage of the chemical materials being applied; an uneven application of the chemical materials where the chemical materials are over applied in certain areas of application and under applied in other areas of application; an application that does not meet specifications due to a failure to meet the minimum application rates specified for the chemical materials by the manufacturer and/or regulating authority; an application that does not meet specifications due to a failure to meet the minimum application band widths specified for the chemical materials by the manufacturer and/or regulating authority; a failure to meet application rate and band width specifications set by the manufacturer and/or regulating authority; etc. Thus, there has remained a need to provide an improved method and application assembly for applying chemical materials, such as pesticides, to vertical and/or horizontal surfaces such as but not limited to the base portions of walls and/or the ground or floors immediately adjacent these walls.

SUMMARY OF THE INVENTION

The method and wheel mounted spraying assembly of the subject invention provide an inexpensive, reliable solution for the exterior and interior application of chemical materials to the base portions of walls and/or the ground or floors adjacent these walls that enables these chemical materials to be quickly applied at even application rates and precise application band widths. The method of the subject invention for applying a chemical material, such as a pesticide, to a surface utilizes a wheel mounted spraying assembly of the subject invention. The wheel mounted spraying assembly includes: a rod having a wheel rotatably mounted on its lower end portion for supporting the spraying assembly on a surface and enabling the spraying assembly to be moved over the surface; a spray nozzle mounted on the spraying assembly adjacent the wheel; a supply line for supplying a chemical material under pressure to the spray nozzle; and a control for controlling the flow of the chemical material to and through the spray nozzle. The spray nozzle is oriented to spray the chemical material in an expanding pattern in an outward direction from one side of the lower portion of the spraying assembly to apply the chemical material to a generally vertical and/or generally horizontal surface off to one side of the spraying assembly.

The method and wheel mounted spraying assembly of the subject invention provide a solution to the time consuming and inexact application procedures of the past by providing an application method and wheel mounted spraying assembly wherein the technicians can rapidly apply chemical materials, such as but not limited to pesticides, at a uniform rate according to the manufactures specifications (e.g. label specifications) as the technicians walk adjacent the surfaces to be treated. The method and wheel mounted spraying assembly of the subject invention apply chemical materials at a precisely controlled rate (e.g. 0.2 gallons per minute) for uniform coverage. The wheel mounted spraying assembly of the subject invention may be used with various pressurized sources of chemical materials such as but not limited to pressurized chemical materials supplied from handheld or backpack pump-up tanks, handheld or backpack pressurized canisters; hose reel and remote pump systems, etc.

The wheel mounted spraying assembly of the subject invention can be used in the method of the subject invention with the spray pattern of the spraying assembly configured solely for a vertical application of a chemical material to create a vertical application band of the chemical material of a desired uniform width on a wall surface (e.g. a band having a uniform width and extending from 12 to 24 inches up from the base of a wall for an application of borate). The wheel mounted spraying assembly of the subject invention can be used in the method of the subject invention with the spray pattern of the spraying assembly configured for a vertical and horizontal application of a chemical material to create an application band of the chemical material on a wall surface and adjacent ground or floor surface having a desired uniform width (e.g. a band having a uniform width and extending from 12 to 24 inches up from the base of a wall and outward from 12 to 24 inches across the ground from the base of the wall for an application of fipronil). The wheel mounted spraying assembly of the subject invention can be used in the method of the subject invention with the spray pattern configured solely for a horizontal application of a chemical material to create an application band of the chemical material on a ground or floor surface having a desired uniform width (e.g. a band having a uniform width and extending from 12 to 24 inches outward over the ground or floor from the base of a wall for an application of fipronil).

BRIEF DESCRIPTION OF THE DRAWINGS

FIG. 3 is a schematic view showing the spray pattern for a wheel mounted spraying assembly of the subject invention configured for the application of chemical materials in a vertical band extending upward from the base of a generally vertical surface.

FIG. 4 is a schematic view showing the spray pattern for a wheel mounted spraying assembly of the subject invention configured for the application of chemical materials in a vertical and horizontal band extending upward from the base of a generally vertical surface and outward from the base of the generally vertical surface.

FIG. 5 is a schematic view showing the spray pattern for a wheel mounted spraying assembly of the subject invention configured for the application of chemical materials in a horizontal band on a generally horizontal surface especially a generally horizontal surface extending outward from the base of a vertical surface.

FIG. 6 is a schematic view, partially in section, of a lower portion of the wheel mounted spraying assembly of FIG. 1.

FIG. 7 is an exploded view of the wheel mounted spraying assembly of FIG. 1.

DESCRIPTION OF THE PREFERRED EMBODIMENTS

Figure 1:
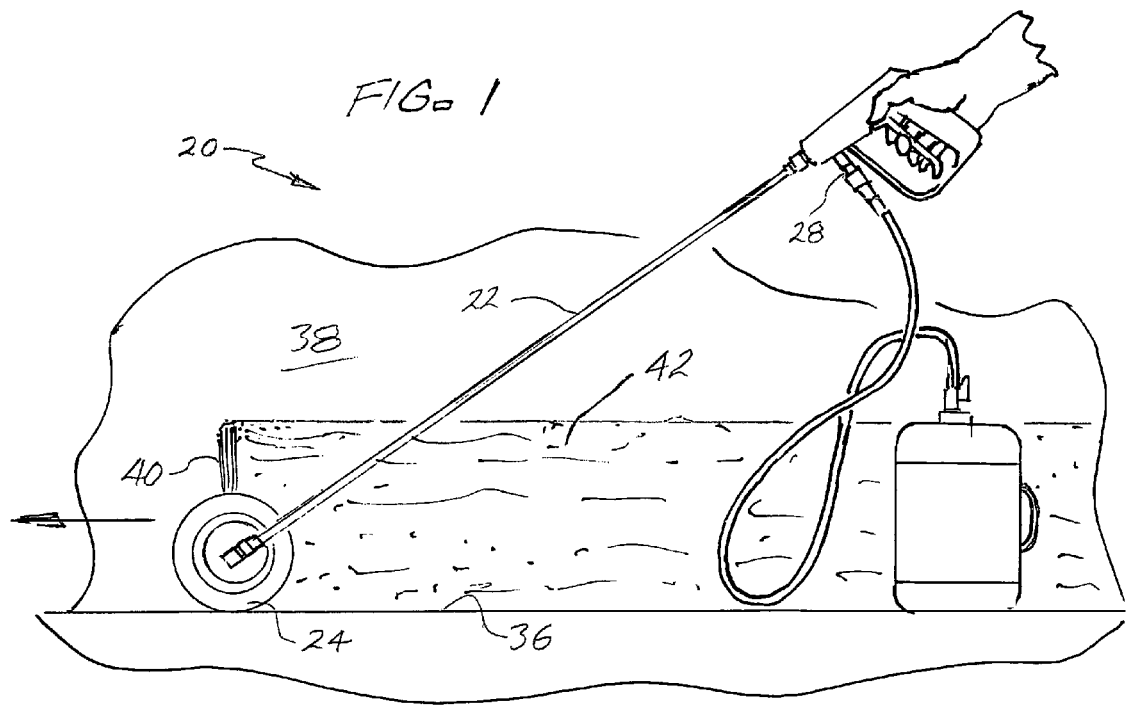
FIG. 1 is a schematic side view of a wheel mounted spraying assembly of the subject invention being utilized in the method of the subject invention to apply a chemical material to a vertical surface.
Figure 2:
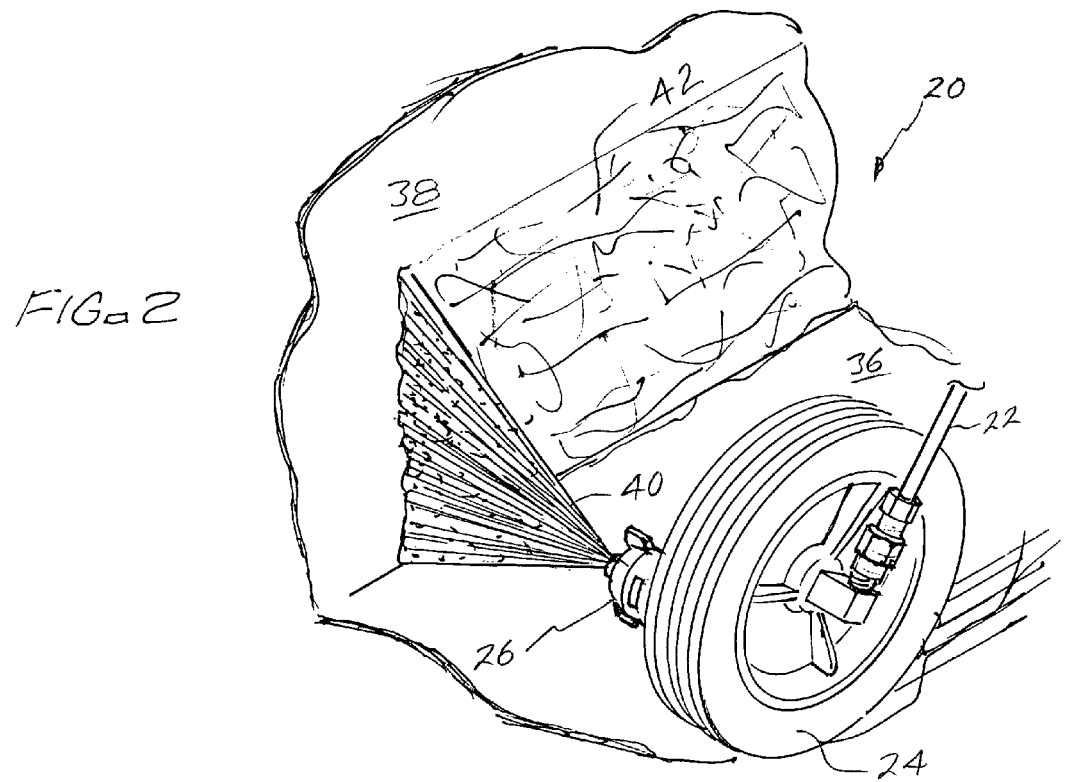
FIG. 2 is a schematic perspective view of the lower portion of the wheel mounted spraying assembly of FIG. 1 applying the chemical material to the vertical surface.

As shown in FIGS. 1 and 2 a preferred embodiment of the wheel mounted spraying assembly 20 of the subject invention includes: a tubular rod 22 having an upper end portion and a lower end portion; a single wheel 24 rotatably mounted on the lower end portion of the rod for supporting the spraying assembly on a surface and enabling the spraying assembly to be moved over the surface; a spray nozzle 26 mounted on the spraying assembly adjacent the wheel for applying a chemical material to a surface or surfaces; a supply line that preferably includes a quick connect/disconnect fitting 28, the tubular rod 22, and a tubular axle 30 supporting the wheel 24 for supplying a chemical material under pressure to the spray nozzle 26; and a hand operated control 32 for controlling the flow of the chemical material to and through the spray nozzle 26 that preferably is incorporated into a handle 34 of the assembly for guiding the wheel mounted spraying assembly. As shown in FIGS. 1 and 2, the wheel mounted spraying assembly 20 is being rolled along a generally horizontal surface 36 (e.g. a ground or floor surface) a preselected distance from a vertical surface 38 (e.g. a wall) to apply a chemical material 40 in a band 42 (preferably a band of a uniform or substantially width) to the vertical surface 38.

FIG. 3 is a schematic view showing the spray pattern for the wheel mounted spraying assembly 20 when the assembly is equipped with a spray nozzle 26 having a spray pattern configured for the application of chemical materials 40 to a generally vertical surface 38 located off to one side of the spraying assembly in a band of a uniform or substantially width that extends upward a specified distance from the base 44 of the generally vertical surface. When applying chemical materials such as pesticides to a generally vertical surface 38, the distance the band extends upward from the base 44 of the generally vertical surface 38 is normally selected to be in a range between twelve inches and twenty-four inches. In the preferred method of the subject invention, the wheel mounted spraying assembly 20 is wheeled over a generally horizontal surface 36 (e.g. ground or floor) in a direction parallel to the generally vertical surface 38 (e.g. wall) at a specified distance from the generally vertical surface and at a specified pace to apply the chemical materials 40 in a band of a specified width at a specified rate of application.

FIG. 4 is a schematic view showing the spray pattern for the wheel mounted spraying assembly 20 when the assembly is equipped with a spray nozzle 26 having a spray pattern configured for the application of chemical materials 40 to a generally vertical surface 38 and a generally horizontal surface 36 located off to one side of the spraying assembly in a band of a uniform or substantially width that extends both upward and outward a specified distance from the base 44 of the generally vertical surface. When applying chemical materials such as pesticides to a generally vertical surface 38 and generally horizontal surface 36, the distance the band extends upward from the base 44 of the generally vertical surface 38 is normally preselected to be in a range between twelve inches and twenty-four inches and the distance the band extends outward from the base 44 of the generally vertical surface 38 is normally preselected to be in a range between twelve inches and twenty-four inches. In the preferred method of the subject invention, the wheel mounted spraying assembly 20 is wheeled over a generally horizontal surface 36 (e.g. ground or floor) in a direction parallel to the generally vertical surface 38 (e.g. wall) at a specified distance from the generally vertical surface and at a specified pace to apply the chemical materials 40 in a band of a specified width at a specified rate of application.

FIG. 5 is a schematic view showing one preferred spray pattern for the wheel mounted spraying assembly 20 when the assembly is equipped with a spray nozzle 26 having a spray pattern configured for the application of chemical materials 40 to a generally horizontal surface 36 in a band of a uniform or substantially width that is formed on the horizontal surface off to one side of the wheel mounted spraying assembly 20. While this embodiment of the wheel mounted spray assembly 20 may be used for other applications, this embodiment of the wheel mounted spray assembly 20 is especially suited for applying chemical materials to a generally horizontal surface 36 that extends outward a specified distance from the base 44 of a generally vertical surface 38. When applying chemical materials such as pesticides to a generally horizontal surface 36 adjacent a generally vertical surface 38, the distance the band extends outward from the base 44 of the generally vertical surface 38 is normally between twelve inches and twenty-four inches. In the preferred method of the subject invention, the wheel mounted spraying assembly 20 is wheeled over the generally horizontal surface 36 (e.g. ground or floor) in a direction parallel to the generally vertical surface 38 at a specified distance from the generally vertical surface and at a specified pace to apply the chemical materials 40 in a band of a specified width at a specified rate of application.

It is also contemplated that the wheel mounted spraying assembly 20 can be used to apply another narrower spray pattern to a generally horizontal surface 36 in a band of a uniform or substantially width that is formed on the generally horizontal surface off to one side of the wheel mounted spraying assembly 20. This narrow spray pattern is accomplished by directing the spray nozzle 26 in a generally downward direction outward from the side of the spraying assembly 20 (not shown) rather than in the generally horizontal direction shown in FIG. 5. While this embodiment of the wheel mounted spray assembly 20 may be used for other applications, this embodiment of the wheel mounted spray assembly 20 is especially suited for applying chemical materials to a generally horizontal surface 36 in a relatively narrow concentrated pattern that is typically about four to six inches wide. This embodiment of the spraying assembly 20 is particularly well suited to applying pesticides over the ground along a path frequented by pests, such as a path or paths used by a colony of ants. When applying chemical materials such as pesticides to a generally horizontal surface 36 along such a path, the technician merely guides the spraying assembly along the ground adjacent the path. With the spray nozzle 26 and pest created path both being located to one side of the spraying assembly 20, the technician can easily see and readily follow the path to precisely apply the chemical materials to the path.

In the preferred method of the subject invention, the wheel mounted spraying assembly 20 is wheeled over a generally horizontal surface 36 (e.g. ground or floor) in a direction parallel to the generally vertical surface 38 at a specified distance from the generally vertical surface and at a specified pace to apply the chemical materials 40 in a band of a specified width at a specified rate of application or in a direction generally parallel to a pest created path, with the spray nozzle generally centered over the path, and at a specified pace to apply the chemical materials in a band of a specified width at a specified rate of application to the path.

As discussed above, a preferred embodiment of the wheel mounted spraying assembly 20 of the subject invention includes: a tubular rod 22 having an upper end portion and a lower end portion; a single wheel 24 rotatably mounted on the lower end portion of the rod for supporting the spraying assembly on a generally horizontal surface and enabling the spraying assembly to be moved over the surface; a spray nozzle 26 mounted on the spraying assembly adjacent the wheel for applying a chemical material 40 to a surface or surfaces; a supply line that preferably includes a quick connect/disconnect fitting 28, the tubular rod 22, and a tubular axle 30 supporting the wheel for supplying a chemical material 40 under pressure to the spray nozzle 26; and a hand operated control 32 for controlling the flow of the chemical material 40 to and through the spray nozzle 26 that preferably is incorporated into a handle 34 of the assembly for guiding the wheel mounted spraying assembly. The pressurized source of chemical material 40 may be a handheld or backpack pump-up tank, a handheld or backpack pressurized canister; a hose reel and remote pump system, etc.

The rod 22 is typically about three feet long. Preferably, the rod 22 and the axle 30 are both tubular and form at least a portion of the supply line for supplying the chemical material 40 to be sprayed from a pressurized source of the chemical material to the spray nozzle 26. However, it is contemplated that rather than using a tubular rod 22 and/or tubular axle 30 as part of the supply line, the supply line could be separate from the rod 22 and/or axle 30, such as but not limited to a tube (not shown) mounted on the exterior of the rod 22 and connected to the spray nozzle 26.

As best shown in FIGS. 6 and 7 the axle 30 is mounted on the lower portion of the rod 22 and the wheel 24, which is typically about seven inches in diameter, is rotatably mounted on the axle 30. The spray nozzle 26 is also mounted on the axle 30 in a fixed location that is stationary with respect to the wheel mounted spraying assembly 20 and oriented to spray the chemical material 40 in a generally outward direction to one side of the lower portion of the wheel mounted spraying assembly 20. With this structure, the chemical material 40 being sprayed from the spray nozzle 26 can be accurately applied to vertical and/or horizontal surfaces located off to one side of the wheel mounted spraying assembly in accordance with the method of the subject invention.

Preferably, the spray nozzle 26, the quick connect/disconnect fitting 28, and other connectors and fittings utilized in the wheel mounted spraying assembly 20 shown in FIGS. 6 and 7 are conventional commercially available components. Preferably, the spraying pattern of the spray nozzle 26 can be changed by merely replacing a nozzle component, such as the nozzle insert 46 of FIGS. 6 and 7, so that the wheel mounted spraying assembly 20 can be easily modified to produce any of the expanding spray patterns illustrated in FIGS. 3 to 5.

Preferably, the flow of pressurized chemical material 40 from the source of pressurized chemical material to and through the spray nozzle 26 is controlled by a conventional control mechanism such as a trigger actuated control valve 32 incorporated into the handle 34 mounted on the upper portion of the rod 22. Typically, a conventional quick connect/disconnect fitting 28 is used to connect the source of pressurized chemical material to the control mechanism 32.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A method of applying a chemical material to a surface, comprising:

providing a wheel mounted spraying assembly; the wheel mounted spraying assembly comprising: a rod having an upper end portion and a lower end portion; a wheel rotatably mounted on the lower end portion of the rod for supporting the spraying assembly on a generally horizontal surface and enabling the spraying assembly to be moved over the generally horizontal surface; a spray nozzle mounted on the spraying assembly adjacent the wheel for spraying a chemical material in an expanding pattern for application to an application surface; the spray nozzle being oriented to spray a chemical material in a generally outward direction to one side of the lower portion of the spraying assembly and apply the chemical material onto a generally vertical surface extending upward from the generally horizontal surface over which the spraying assembly is being moved and to a portion of the generally horizontal surface over which the spraying assembly is being moved that is located intermediate the spray nozzle and the generally vertical surface; supply line means for supplying a chemical material under pressure to the spray nozzle; and control means for controlling flow of a chemical material to and through the spray nozzle; and using the spraying assembly to apply a chemical material to an application surface that is a generally vertical surface extending upward from the generally horizontal surface over which the spraying assembly is being moved and a portion of the generally horizontal surface over which the spraying assembly is being moved that is located intermediate the spray nozzle and the generally vertical surface wherein the chemical material is applied in a band having a uniform or substantially uniform width.

2. The method of applying a chemical material to a surface according to claim 1, wherein:
   the chemical material is a pesticide.

3. The method of applying a chemical material to a surface according to claim 1, wherein:
   the spraying assembly is moved in a direction parallel to the application surface at a selected distance and at a selected pace.

4. The method of applying a chemical material to a surface according to claim 1, wherein:
   the chemical material is a pesticide.

5. The method of applying a chemical material to a surface according to claim 1, wherein:
   the spraying assembly is moved in a direction parallel to the application surface at a selected distance and at a selected pace.

6. A method of applying a chemical material to a surface, comprising:
   providing a wheel mounted spraying assembly; the wheel mounted spraying assembly comprising: a rod having an upper end portion and a lower end portion; a wheel rotatably mounted on a tubular axle that is mounted on the lower end portion of the rod for supporting the spraying assembly on a generally horizontal surface and enabling the spraying assembly to be moved over the generally horizontal surface; a spray nozzle nonrotatably mounted on the tubular axle and adjacent the wheel for spraying a chemical material in an expanding pattern for application to an application surface; the spray nozzle being oriented to spray the chemical material in a generally outward direction to one side of the lower portion of the spraying assembly; supply line means for supplying a chemical material under pressure to the spray nozzle; the tubular axle being a portion of the supply line; and control means for controlling the flow of the chemical material to and through the spray nozzle; the rod of the spraying assembly being a tubular rod and comprising at least a portion of the supply line for supplying the chemical material to be sprayed to the spray nozzle; and
   using the spraying assembly to apply a chemical material to an application surface in a band having a uniform or substantially uniform width.

7. The method of applying a chemical material to a surface according to claim 6, wherein:
   the control means on the spraying assembly for controlling the flow of the chemical material to the spray nozzle is included in a handle means mounted on the upper portion of the rod.

8. The method of applying a chemical material to a surface according to claim 7, wherein:
   the handle means of the spraying assembly includes a quick connect/disconnect means for connecting a pressurized source of the chemical material to the portion of the supply line formed by the rod.

9. A wheel mounted spraying assembly, comprising:
   a rod, the rod having an upper end portion and a lower end portion;
   a wheel, rotatably mounted on a tubular axle that is mounted on the lower end portion of the rod, for supporting the spraying assembly on a generally horizontal surface and enabling the spraying assembly to be moved over the generally horizontal surface;
   a spray nozzle mounted on the tubular axle and adjacent the wheel; the spray nozzle being oriented to spray the chemical material in an expanding pattern in a generally outward direction to one side of the lower portion of the spraying assembly;
   supply line means for supplying a chemical material to be sprayed to the spray nozzle; the rod being a tubular rod about three feet long; and the rod and the tubular axle comprising at least a portion of the supply line for supplying the chemical material to be sprayed to the spray nozzle; and
   control means for controlling the flow of the chemical material to and through the spray nozzle.

10. The wheel mounted spraying assembly according to claim 9, wherein:
    the wheel is rotatably mounted on the axle and the spray nozzle in nonrotatably mounted on the axle.

11. The wheel mounted spraying assembly according to claim 9, wherein:
    the control means for controlling the flow of the chemical material to the spray nozzle is included in a handle means mounted on the upper portion of the rod.

12. The wheel mounted spraying assembly according to claim 11, wherein:
    the handle means includes a quick connect/disconnect means for connecting a pressurized source of the chemical material to the portion of the supply line formed by the rod.

13. The wheel mounted spraying assembly according to claim 9, wherein:
    the spray nozzle sprays the chemical material in an expanding pattern that enables the chemical material to be applied to a generally vertical surface located to one side of the spraying assembly and extending upward from the generally horizontal surface over which the spraying assembly is being moved.

14. The wheel mounted spraying assembly according to claim 9, wherein:
    the spray nozzle sprays the chemical material in an expanding pattern that enables the chemical material to be applied to a generally vertical surface located to one side of the spraying assembly and extending upward from the generally horizontal surface over which the spraying assembly is being moved and a portion of the generally horizontal surface over which the spraying assembly is being moved located to one side of the spraying assembly and extending outward from the generally vertical surface.

15. The wheel mounted spraying assembly according to claim 9, wherein:
    the spray nozzle sprays the chemical material in an expanding pattern that enables the chemical material to be applied to a portion of the generally horizontal surface over which the spraying assembly is being moved located to one side of the spraying assembly.

* * * * *